United States Patent
Nevinsky et al.

(10) Patent No.: US 12,321,669 B2
(45) Date of Patent: Jun. 3, 2025

(54) THERMAL MANAGEMENT FOR COMPOSITE TOOLING

(71) Applicant: The Boeing Company, Chicago, IL (US)

(72) Inventors: Michael D. Nevinsky, Media, PA (US); Gina M. Miller, Philadelphia, PA (US); Christopher Jay Felker, Downingtown, PA (US); Michael Vincent D'Olio, Philadelphia, PA (US); David Thomas Misciagna, West Chester, PA (US)

(73) Assignee: THE BOEING COMPANY, Arlington, VA (US)

( * ) Notice: Subject to any disclaimer, the term of this patent is extended or adjusted under 35 U.S.C. 154(b) by 222 days.

(21) Appl. No.: 18/063,059

(22) Filed: Dec. 7, 2022

(65) Prior Publication Data

US 2024/0193314 A1    Jun. 13, 2024

(51) Int. Cl.
| | |
|---|---|
| *F28F 7/00* | (2006.01) |
| *G06F 30/10* | (2020.01) |
| *H05K 7/20* | (2006.01) |
| *G06F 113/10* | (2020.01) |

(52) U.S. Cl.
CPC ........... *G06F 30/10* (2020.01); *H05K 7/2039* (2013.01); *G06F 2113/10* (2020.01)

(58) Field of Classification Search
CPC .... G06F 30/10; G06F 2113/10; H05K 7/2039
See application file for complete search history.

(56) References Cited

U.S. PATENT DOCUMENTS

| | | | |
|---|---|---|---|
| 4,927,712 A | 5/1990 | Lhymn et al. | |
| 5,344,515 A | 9/1994 | Chenock, Jr. | |
| 8,834,668 B2 | 9/2014 | Nelson et al. | |
| 11,065,828 B2 | 7/2021 | Roberts | |
| 2004/0216856 A1 | 11/2004 | Pacchiana et al. | |
| 2013/0101406 A1 | 4/2013 | Kweder et al. | |
| 2016/0121555 A1 | 5/2016 | Kunc et al. | |
| 2020/0103857 A1* | 4/2020 | Wynne | G05B 19/4099 |

(Continued)

OTHER PUBLICATIONS

Non-Final Office Action mailed in co-pending U.S. Appl. No. 18/063,051 on Feb. 9, 2024, 10 pages.

(Continued)

*Primary Examiner* — Davis D Hwu
(74) *Attorney, Agent, or Firm* — MH2 Technology Law Group LLP

(57) ABSTRACT

A tool for forming a composite part and a method of making the tool and the composite part are disclosed. The tool includes a top surface that supports the composite part during forming, the top surface comprising a first lateral portion and a second lateral portion arranged on either side of a central part contacting surface; a first integrated heat sink arranged on an opposite surface of the top surface, wherein a shape of the first integrated heat sink is based on a thermal topology optimization process of the tool; a first vacuum port arranged at a first location on the first lateral portion; and a second vacuum port arranged at a second location on the first lateral portion, wherein the first vacuum port and the second vacuum port provide access to a vacuum pump to provide at least a partial vacuum to the top surface during composite part formation.

20 Claims, 13 Drawing Sheets

(56) References Cited

U.S. PATENT DOCUMENTS

2021/0008765 A1    1/2021   Connell
2021/0349439 A1*  11/2021  Osgood ................ B29C 64/386
2022/0134672 A1*   5/2022  Matusik ................ B33Y 10/00
                                                                                      264/40.6

OTHER PUBLICATIONS

Final Office Action mailed in co-pending U.S. Appl. No. 18/063,051 on May 2, 2024, 11 pages.
Extended European Search Report issued Apr. 24, 2024 in related EP Application No. 23213276.1, 14 pages.
Extended European Search Report issued May 3, 2024 in corresponding EP Application 23213282.9, 6 pages.

* cited by examiner

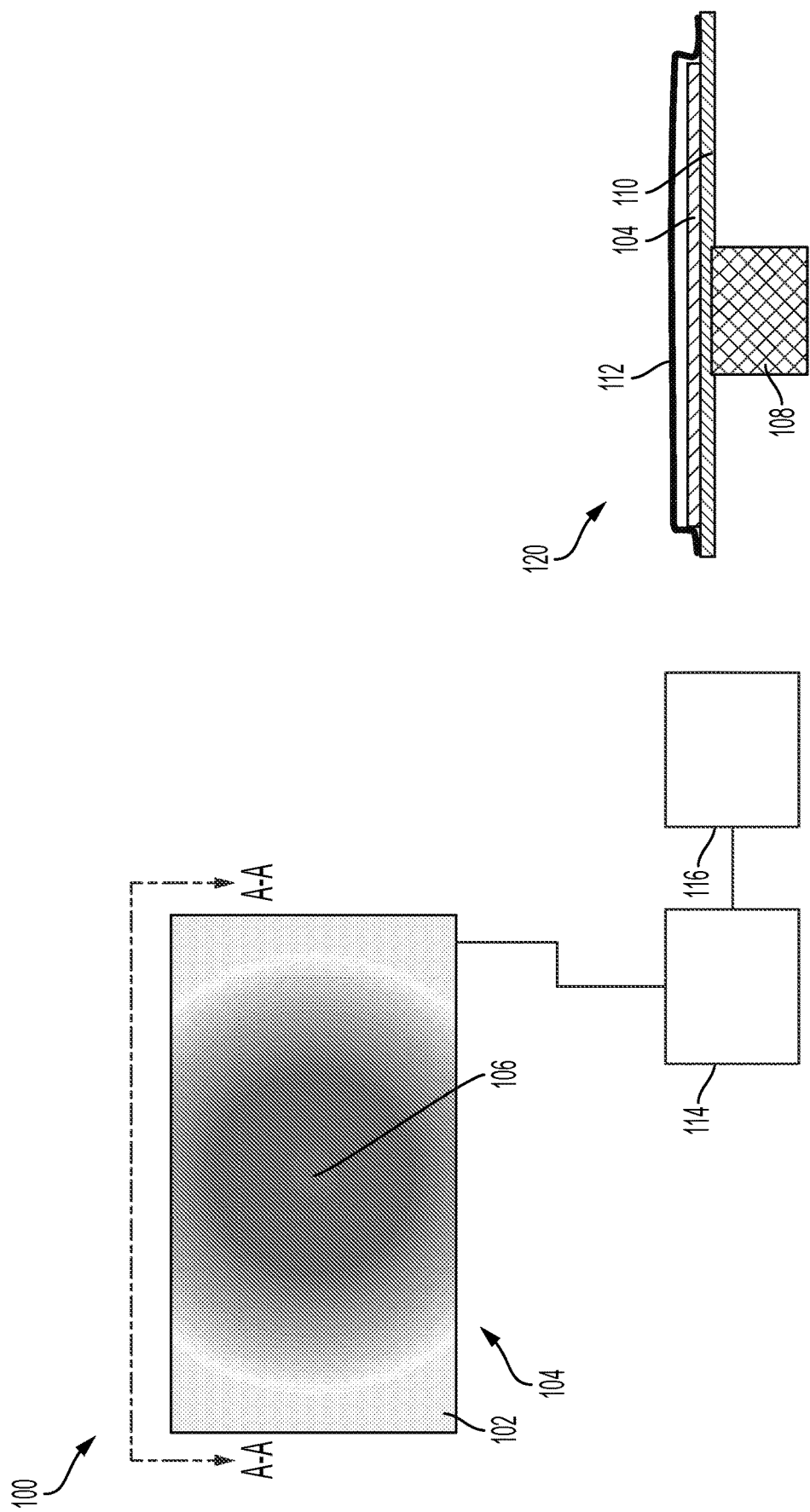

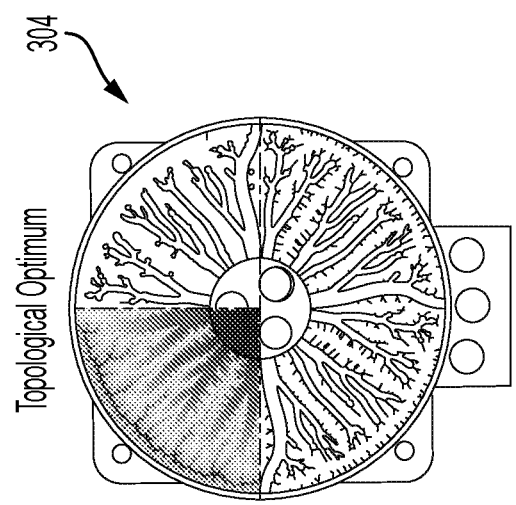
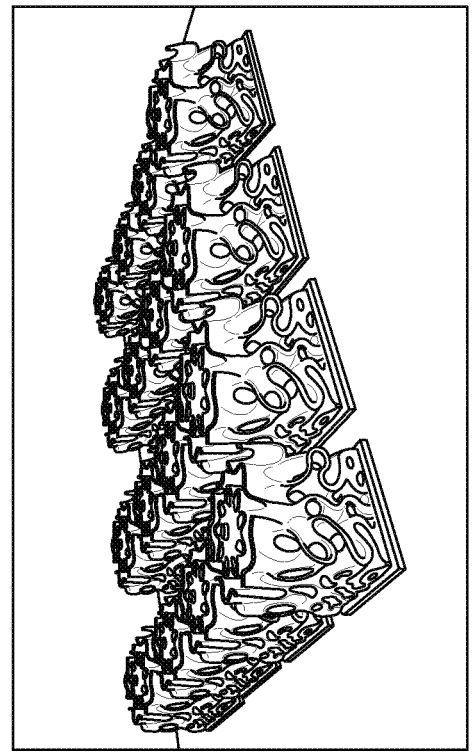
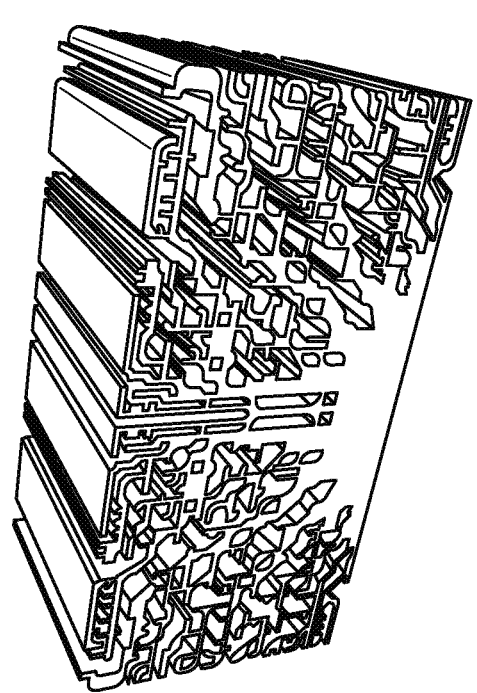
FIG. 3A
FIG. 3B
FIG. 3C
FIG. 3D

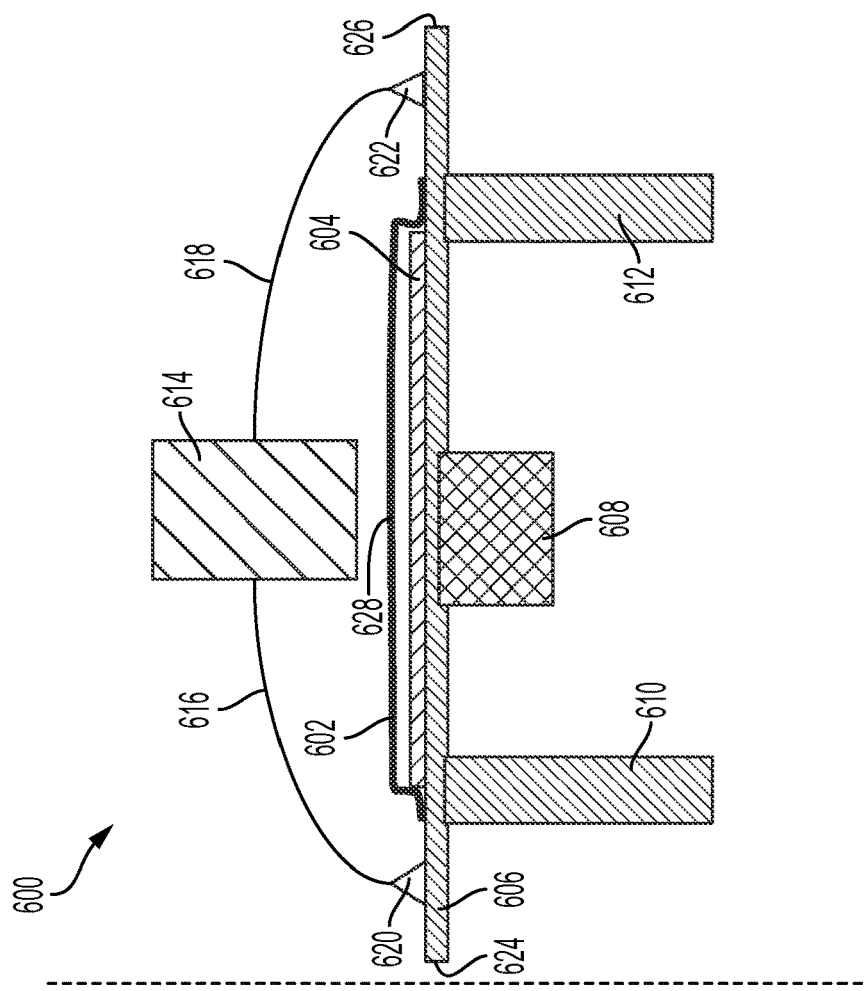
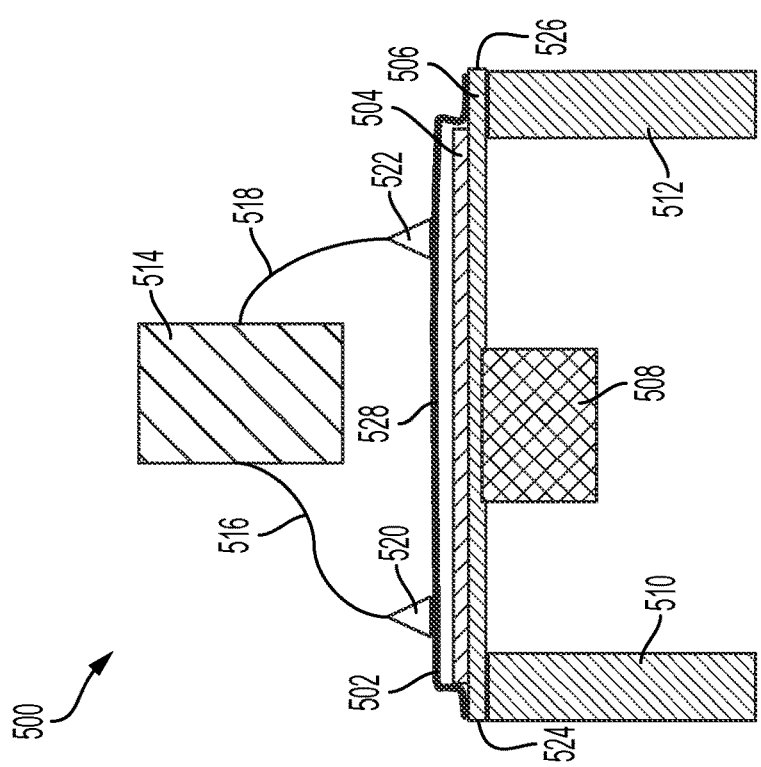
FIG. 6
FIG. 5

THERMAL MANAGEMENT FOR COMPOSITE TOOLING

FIELD

The present disclosure is directed to methods and systems for thermal management for composite tooling.

BACKGROUND

To ensure composite parts meet design, strength, and durability requirements, composite materials must be manufactured such that the cure profile of the part is maintained within process specification requirements.

Thus, there is a need in the art to address one or more deficiencies in the composite manufacturing process.

SUMMARY

According to examples of the present disclosure, a tool for forming a composite part is disclosed. The tool comprises a top surface that supports the composite part during forming, the top surface comprising a first lateral portion and a second lateral portion arranged on either side of a central part contacting surface; a first integrated heat sink arranged on an opposite surface of the top surface, wherein a shape of the first integrated heat sink is based on a thermal topology optimization process of the tool; a first vacuum port arranged at a first location on the first lateral portion; and a second vacuum port arranged at a second location on the first lateral portion, wherein the first vacuum port and the second vacuum port provide access to a vacuum pump to provide at least a partial vacuum to the top surface during composite part formation. The thermal topology optimization process comprises an integrated heat sink design process, a thermal optimization process, and an analysis process. To create the integrated heat sink, a geometrical envelope, one or more structural parameters, and one or more thermal inputs are provided as inputs to the thermal topology optimization process.

Various additional features can be included in the tool including one or more of the following features. The tool can further comprise a second integrated heat sink arranged on the first lateral portion, the second lateral portion, or the opposite surface. The tool, the first integrated heat sink, or both the tool and the first integrated heat sink comprise one or more fluidic pathways for additional air-cooling heat dissipation. The tool can further comprise an enclosure that is arranged over the top surface to provide the partial vacuum during the composite part formation. The tool, the first integrated heat sink, and the second integrated heat sink are formed by an additive manufacturing process.

According to examples of the present disclosure, a method of forming a composite part using a tool with an integrated heat sink is disclosed. The method comprises placing the composite part on a top surface of the tool during manufacture; providing at least a partial vacuum to the composite part; and dissipating heat away from the composite part by the integrated heat sink toward a surface opposite the top surface, wherein a shape of the integrated heat sink is based on a thermal topology optimization process of the tool to cure the composite part.

According to examples of the present disclosure, a method for manufacturing of a tool for forming a composite part with an integrated heat sink is disclosed. The method comprises obtaining a digital representation of the tool to be manufactured; performing, using one or more hardware processors, a first thermal topology optimization process of the digital representation using one or more thermal computer models; determining, using the one or more hardware processors, a first thermal hot spot of the tool after manufacture using the first thermal topology optimization process; creating, a first digital representation of a first integrated heat sink that is configured to mitigate the first thermal hot spot based on the first thermal topology optimization process; and generating the tool and the first integrated heat sink using a manufacturing tool, wherein a shape of the first integrated heat sink is based on the first thermal topology optimization process of the tool, wherein a shape of the first integrated heat sink is based on the first thermal topology optimization process of the tool. The thermal topology optimization process can comprise an integrated heat sink design process, a thermal optimization process, and an analysis process. To create the heat sink, a geometrical envelope, one or more structural parameters, and one or more thermal inputs are provided as inputs to the thermal topology optimization process. The functional generative process uses these inputs to automate an iterative thermal topology optimization process and output geometry from data inputs.

Various additional features can be included in the tool including one or more of the following features. The digital representation of the tool is a computer-aided design drawing. The first thermal topology optimization process is based on one or more parameters for heat transfer efficiency and maximizing surface area of the tool where the integrated heat sink is applied. The tool and the first integrated heat sink are generated at the same time. The tool and the first integrated heat sink are generated at different times. The tool, the first integrated heat sink, or both the tool and the first integrated heat sink comprise one or more air cooling fluidic pathways for additional heat dissipation. The method further comprises performing, using the one or more hardware processors, a second thermal topology optimization process of the tool during or after manufacture; determining, using the one or more hardware processors, a second thermal hot spot of the tool during or after manufacture; creating, a second digital representation of a second integrated heat sink that is configured to mitigate the second thermal hot spot based on the second thermal topology optimization process; and generating the second integrated heat sink. The second thermal topology optimization process is similar to the first thermal topology optimization process discussed above and further below.

According to examples of the present disclosure, a system is disclosed. The system comprises a computer comprising a hardware processor and a storage media that stores instruction that when executed by the hardware processor perform a method for manufacturing of a tool for forming a composite part with an integrated heat sink, the method comprising: obtaining a digital representation of a tool to be manufactured; performing, using one or more hardware processors, a first thermal topology optimization process of the digital representation using one or more thermal computer models; determining, using the one or more hardware processors, a first thermal hot spot of the tool after manufacture using the first thermal topology optimization process; creating, a first digital representation of a first integrated heat sink that is configured to mitigate the first thermal hot spot based on the first thermal topology optimization process; and generating the tool and the first integrated heat sink using a manufacturing tool, wherein a shape of the first integrated heat sink is based on the first thermal topology optimization process of the tool. In some examples, the tool with a topologically optimized geometry can be manufactured using an additive manufacturing tool.

Various additional features can be included in the tool including one or more of the following features. The first digital representation of the tool is a computer-aided design drawing. The thermal analysis is based on one or more parameters for heat transfer efficiency and maximizing surface area of the tool where the integrated heat sink is applied. The tool and the first integrated heat sink are generated at the same time. The tool and the first integrated heat sink are generated at different times. The tool, the first integrated heat sink, or both the tool and the first integrated heat sink comprise one or more fluidic pathways for additional heat dissipation. The hardware processor is further configured to perform the method comprising: performing, using the one or more hardware processors, a second thermal topology optimization process of the tool during or after manufacture; determining, using the one or more hardware processors, a second thermal hot spot of the tool during or after manufacture; creating, a second digital representation of a second integrated heat sink that is configured to mitigate the second thermal hot spot based on the second thermal topology optimization process; and generating the second integrated heat sink using an additive manufacturing tool. The system can further comprise the additive manufacture tool that is electrically connected to the computer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

FIG. 1A shows a top view 100 of a composite part according to examples of the present disclosure.

FIG. 1B shows a side view 120 cross section taken along the line A-A of FIG. 1A.

FIG. 3A and FIG. 3B show different thermal analysis results for a integrated heat sink according to examples of the present disclosure.

FIG. 3C and FIG. 3D shows additional integrated heat sink examples according to examples of the present disclosure.

FIG. 5 shows a similar arrangement of composite part system 500 of the arrangement of FIG. 1B with the addition of example integrated heat sinks according to examples of the present disclosure.

FIG. 6 shows a similar arrangement of composite part system 600 of the arrangement of FIG. 1B with the addition of example integrated heat sinks according to examples of the present disclosure.

Figure 2D:
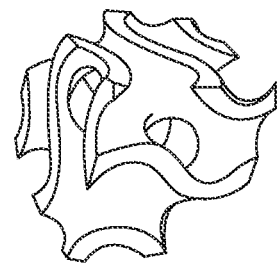
FIG. 2A, FIG. 2B, FIG. 2C, FIG. 2D, FIG. 2E, and FIG. 2F shows different examples of an AM integrated heat sink that can be used as integrated heat sink 108 in FIG. 1B.
Figure 2C:
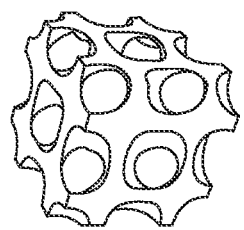
Figure 2F:
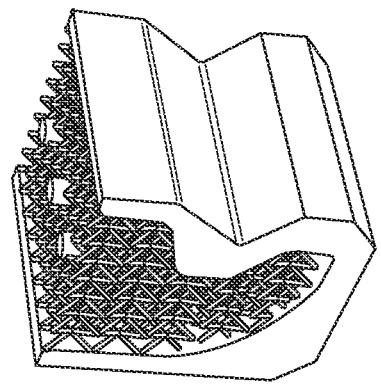
Figure 2B:
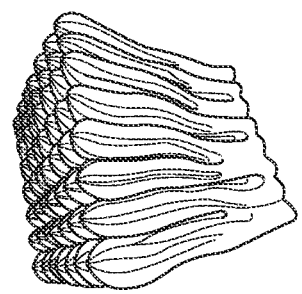

It should be noted that some details of the figures have been simplified and are drawn to facilitate understanding rather than to maintain strict structural accuracy, detail, and scale.

DETAILED DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

During the part and tool qualification process, thermal profile(s) are performed to understand the temperature across the part/tool and to identify leading and lagging thermocouple locations. Non-uniform thermal profiles can impact cure kinetics and result in cooler areas of the part having lower degree of cure or glass transition temperature. If a thermal profile were normalized and predictable across the face of a tool, a higher quality cure is possible. Tooling that is used to make composite parts can comprise large, complex geometry and will typically utilize heavy, low CTE materials. Tools may have additional requirements that affect design of tool (i.e., "must be mounted on rotating fiber placement machine"). A composite can include, but is not limited to, glass fiber reinforced plastics (GFRP), carbon fiber reinforced plastics (CFRP), aramid fiber reinforced plastic (AFRP), such as Kevlar® para-aramid fiber, ceramic matrix composites (CMC), metal matrix composites (MMC), etc.

The present disclosure is directed to tooling including integrated heat sinks, and in particular integrated heat sinks and method of making the same. The integrated heat sinks are part of a tool, which can be composed of a metallic material. The tool which features one or more integrated heat sinks is used to cure composite parts which have been laid up on the tool. The integrated heat sink can be integrally formed with a tool being manufactured, for example using an additively manufacturing (AM) process, and at a location of a thermal hotspot. AM enables less material consumption on a supporting structure, such as a bond jig. In some cases, a tool is manufactured by means of a large scale additive manufacturing process where the geometric dimensions of an additive manufacturing printer's head is not a factor. The thermal hotspot can be determined before the part is manufactured by performing a thermal analysis of the part. The integrated heat sink can be used to mitigate concerns of tool temperature peaks during cure cycle. The integrated heat sink can be printed in place, or printed and attached to a part, such as an existing machined tool. This provides the ability of a retrofit thermally-based option for all composite tools. For example, a new tool that is just manufactured may offer an effective solution. However, a composite tool may exist and may cost many millions of dollars. In this case, this present tool design and fabrication process may be used to create integrated heat sinks that can be retrofitted to existing tools to improve effectiveness.

The thermal analysis provides a predictive model of tool thermal profiles. The thermal analysis can include a part-tool thermal profile process to characterize the thermal profile of a tool's functional surface and how it will affect a part during a cure cycle. A part-tool thermal profile can be performed with physical hardware and instrumentation, or it can be performed virtually with models in a software such as COMPRO or RAVEN. This part-tool thermal profile takes into account the shape, mass, material of a part and the tool as well as the equipment used to cure the part, such as an oven, an autoclave, or a press, and the conditions of that equipment, such as pressure, air circulation, volume of chamber, temperature, heat up rate, etc. Thermocouples can be affixed between the part and the tool all across the surface area of the part and data points are generated across the entirety of the cure process to characterize the thermal profile of the part and tool during this process. These data points are then input into a digital analysis process which simulates the integrated heat sink on the tool to augment thermal flow during cure and thus change the thermal profile. According to examples, a shape, a placement, and a complexity of the integrated heat sink geometry is tailorable and is configured to be placed to mitigate hot spots on a part-tool thermal profile. Additionally, examples of the present disclosure provide for modification of existing tools (or modifying a tool is if the initial optimization is off). If an existing tool has hotspots, examples of the present disclosure provide for a custom AM integrated heat sink to be designed and added to a backside of an existing tool.

Moreover, if one's initial modified model was off or if the part-tool thermal profile were to change due to a manufacturing decision, such as tool placement or orientation in autoclave/oven, examples of the present disclosure can allow for a modular integrated heat sink to be taken out and replaced with one with a different geometry or can allow for a tooling component swap to mitigate hot spots associated with a new thermal profile. This modularity feature allows additional integrated heat sink geometry to be added with only a tool modular modification rather than the design and manufacture of a completely new tool.

In further examples, the integrated heat sink or part, can be manufactured with integral vacuum ports, which can allow a user to eliminate cutting vacuum holes into a bag that is used during manufacture to mitigate risk of leakage. Vacuum ports can be positioned in a manner which will not deleteriously affect surface quality of the integrated heat sink or the part being manufactured. For example, when a composite part is cured in an oven or autoclave a bagging material covers the part and is sealed to the tool such that air cannot escape or enter under the bag. Vacuum ports are then added to a tool by piercing and penetrating the bag. The ports seal to the bag and allow the user to draw vacuum on the bag and draw out all air and volatiles under the bag. This is a step to composite cure as it ensure proper compaction and consolidation of the material. However, each time that a bag is creased, pierced, punctured, etc. there is a possibility for that bag to leak air during cure. If this occurs, the part is usually scrapped. By integrating vacuum ports into the tool, an integrated air channel(s) within the tool allows air and volatiles to be drawn out from under the bag via vacuum without the additional risk of piercing the bagging material and creating opportunity for leakage.

In some examples, the integrated heat sink geometry in plumbed cavity can incorporate turbulator features to break up fluid boundary layer, which aids in thermal conductivity at wall/tool surface. A turbulator can be printed in place to mitigate fluid boundary effects seen in laminar or near laminar flow. This feature can provide a controlled but expedient cooling feature after laminate consolidation to increase manufacturing rate.

In some examples of the present disclosure, a thermal optimization process can also be used to optimize thermal profile on a bag-side of the part being manufactured. As cauls and pressure intensifiers are being used during AM, they could negatively affect cure kinetics depending on cure recipe and geometry of caul. A customized caul can be inserted in the tool to achieves a more predictable resin performance during cure. A similar thermal optimization concept to cauls and pressure intensifiers can be used to modify thermal profile upper and lower platen of a heat press. For example, a bag is a flexible material which confirms to the shape of the laid up composite material. On the bag side of a cured composite (in an autoclave or oven), a caul is used to create a smooth and more uniform surface that has tight profile tolerance requirements. A caul is typically a plate which mimics the bag side shape of the part. In places where there is a much more severe concavity (such as a c-channel, L or T profile with an up-standing leg, etc), a plate cannot be used to achieve the effects of a caul plate. In that case, a pressure intensifier which mimic the volume inside the concavity is used to provide to appropriate rigid surface to intensify pressure where a bag cannot.

FIG. 1A shows a top view 100 of a tool showing a thermal profile according to examples of the present disclosure. FIG. 1B shows a side view 120 cross section taken along the line A-A of FIG. 1A. As shown in FIG. 1A, top surface 102 of tool 110 composed of one or more materials, has a thermal hot spot 106 radiating from a center location on top surface 102. Tool 110 is used to form composite part 104. Tool 110 can be manufactured to be shaped in a variety of manners depending on the type of composite part 104 that is to be formed, including but is not limited to, one or more straight portions and/or one or more curved portions. Tool 110 is connected to computer 114, which is configured with a thermal analysis software that can determine potential thermal hot spots based on one or more factors, including to, but are not limited, to computer-aided design drawings of the part being manufactured. The thermal analysis software can be configured to perform one or more thermal topology optimization processes of tool 110. In one non-limiting example, a computer 114 can use a thermal optimization modeling and simulation tool such as COMPRO or other optimization tool suite, where thermal inputs can be generated as a composite bond jig that is designed in 3DX, Inspire, or other topological digital modeling CAD tools. As discussed above, the thermal inputs represent factors that affect the heat transfer during the curing process. For example, the thermal input factors can include, but are not limited to, air flow in an autoclave or a press, a mass of a part tool in an oven or an autoclave, whether or not other parts are in the autoclave or the oven for the purposes of a batch cure, part material, tool material, etc.

The thermal topology optimization process comprises an integrated heat sink design process, a thermal optimization process, and an analysis process. To create the integrated heat sink, a geometrical envelope, one or more structural parameters, and one or more thermal inputs are provided as inputs to the thermal topology optimization process. The geometrical envelope is a block of 3D space that a design may exist within and represents the maximum height, width, and length of a design and also represents the 3D coordinate location of that 3D space. The structural parameters can include structural load cases. For example, an integrated heat sink supports its own weight and stands up to some handling loads such that if a mechanic or technician were to accidently bump into or grab the integrated heat sink, the integrated heat sink would not be rendered ineffective or partially destroyed. The thermal inputs represent factors that affect the heat transfer during the curing process. For example, the thermal input factors can include, but are not limited to, air flow in an autoclave or a press, a mass of a part tool in an oven or an autoclave, whether or not other parts are in the autoclave or the oven for the purposes of a batch cure, part material, tool material, etc. The functional generative process uses these inputs to automate an iterative thermal topology optimization process and output geometry from data inputs.

In some examples, the modeling and simulation tool uses the thermal inputs to model a composite cure and the heat transfer associated with the cure. Heat transfer can occur at different rates across the face of the tool. This is because certain inputs such as "mass of tool," "mass of part," or "access to circulating air" can vary across the face of the tool. If heat transfer is occurring at a slower rate than desired, this is functionally a "cold spot" where a discrete temperature on a select point location of the part-tool interface is lower than the overall average temperature of the part-tool interface. Similarly, if heat transfer is occurring at an accelerated rate which is higher than desired, this is functionally a "hot spot" where a discrete temperature at a select point location of the part-tool interface is higher than the overall average temperature of the part-tool interface.

Computer 114 can be coupled with additive manufacturing device 116. These thermal inputs can be imposed on a design space to automatically generate integrated heat sink geometry on the back side (non-functional side) of tool 110 that dissipates heat away from a composite part form surface of tool 110 during formation of composite part 104.

As shown in FIG. 1B, composite part 104 is mounted on tool 110 during composite part 104 formation. Integrated heat sink 108, which can be created using the same manufacturing process that was used to form tool 110 and at the same time or at a different time, is mounted to an underside surface of tool 110 and provides a thermal sink for tool 110 and composite part 104, resulting in an evenly spread thermal surface on composite part 104. For example, a thermal profile will show peaks and valleys in temperature which are effectively indicative of peaks and valleys in thermal energy across the face of the tool during cure. In some cases, these hot spots will deleteriously affect cure kinetics resulting in low degree of cure, porosity and voiding, untenable resin flow if cross-linking doesn't occur at an appropriate rate, etc. By strategically generating integrated heat sink geometry and strategic placement of that integrated heat sink or integrated heat sinks, these thermal peaks and valleys are eliminated or effectively mitigated to the point where the profile of thermal energy across the face of the tool during cure is effectively uniform.

Although FIG. 1B shows one integrated heat sink 108, there may be more than one depending on the thermal analysis for the particular composite part 104 being manufactured. Vacuum bag 112 is arranged on top surface of composite part 104 to provide a vacuum environment for composite part 104 to complete forming, such as finish bonding or curing depending on the type and/or process by which composite part 104 is being manufactured.

FIG. 2A, FIG. 2B, FIG. 2C, FIG. 2D, FIG. 2E, and FIG. 2F shows different examples of an AM integrated heat sink that can be used as integrated heat sink 108 in FIG. 1B. The particular type, construction, materials, and shape of the integrated heat sink are optimized based on the particular composite part 104 being manufactured.

FIG. 3A and FIG. 3B show different thermal analysis results for an integrated heat sink according to examples of the present disclosure. FIG. 3A shows parametric optimum results 302 and FIG. 3B shows topological optimum results 304 for an integrated heat sink. FIG. 3C and FIG. 3D shows additional integrated heat sink examples that were formed using a topological optimization process according to examples of the present disclosure.

Figure 4:
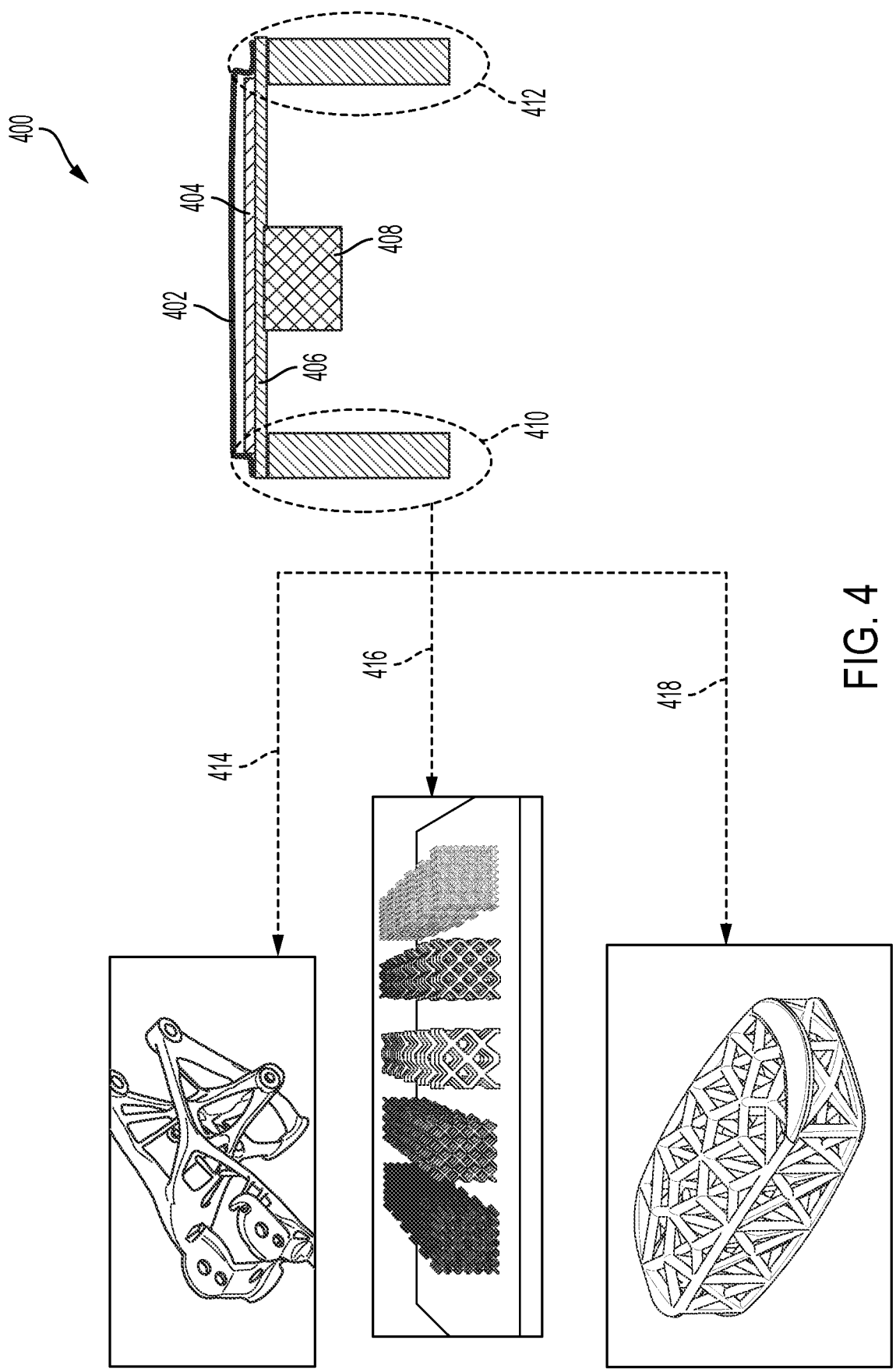
FIG. 4 shows a similar arrangement of composite part system 400 of the arrangement of FIG. 1B with the addition of example integrated heat sinks according to examples of the present disclosure.

FIG. 4 shows a similar arrangement of system 400 of the arrangement of FIG. 1B with the addition of example integrated heat sinks according to examples of the present disclosure. As shown in FIG. 4, composite part 404 is mounted on tool 406. Integrated heat sink 408, which can be created using the same manufacturing process that was used to form tool 406 and at the same time or at a different time, is mounted to an underside surface of tool 406 and provides a thermal sink for tool 406 and composite part 404, resulting in an evenly spread thermal surface on composite part 404. Additional integrated heat sinks 410 and 412 are shown encircled by dashed lines in FIG. 4 and at an edge of composite part 404 and tool 406. Additional integrated heat sinks 410 and 412 can take the any of the forms as shown by alternative integrated heat sink 414, alternative integrated heat sink 416, and alterative integrated heat sink 418, for example. Alternative forms of additional integrated heat sinks 410 and 412 can also be used based on the thermal characteristics of composite part 404. Vacuum bag 402 is arranged on top surface of composite part 404 to provide a vacuum environment for composite part 404 to complete forming, such as finish bonding or curing depending on the type and/or process by which composite part 404 is being manufactured.

FIG. 5 shows a similar arrangement of composite part system 500 of the arrangement of FIG. 1B with the addition of example integrated heat sinks according to examples of the present disclosure. As shown in FIG. 5, composite part 504 is mounted on tool 506. Integrated heat sink 508, which can be created using the same manufacturing process that was used to form tool 506 and at the same time or at a different time, is mounted to an underside surface of tool 506 and provides a thermal sink for composite part 504, resulting in an evenly spread thermal surface on tool 506 and composite part 504. Additional supports 510 and 512, which may be for example additional integrated heat sinks, are arranged at an edge of composite part 504 and tool 506. Additional supports 510 and 512 of tool 506, which can be additional integrated heat sinks or have integrated heat sink-like properties, can take the any of the forms as shown in FIG. 2A, FIG. 2B, FIG. 2C, FIG. 2D, FIG. 2E, FIG. 2F, FIG. 3C, FIG. 3D, or FIG. 4, for example. Alternative forms of additional supports 510 and 512 can also be used based on the thermal characteristics of tool 506. For example, additional supports 510 and 512, that function as additional integrated heat sinks, are created using the optimization process which uses structural and thermal inputs as discussed above. The structural inputs on the non-functional surface of the tool opposite the surface that contacts the composite part are limited. In this case, an integrated heat sink must only support its own weight plus any limited handling loads seen when moving the tool about in a shop or lab. For an integrated heat sink on supports, the structural inputs are different and thus the integrated heat sink geometry will functionally be different. Structural supports must not only support their own weight but the weight of the tool and the part during curing and thus more mass will be used to create these supports. As more mass is used, the opportunity for surface area maximization differs from that of an integrated heat sink which only must use mass to support its own weight. Vacuum bag 502 is arranged on top surface of composite part 504 to provide a vacuum environment for composite part 504 to complete forming, such as finish bonding or curing depending on the type and/or process by which composite part 504 is being manufactured. Vacuum pump 514 provides a vacuum environment to vacuum bag 502 through vacuum couplers 516, 518 that are attached to vacuum ports 520, 522, respectively, arranged on first lateral portion 524 and second lateral portion 526, respectively. In the example shown in FIG. 5, vacuum ports 520, 522 are arranged to a top surface of vacuum bag 502, for example at areas offset from a center part contacting surface 528.

Figure 2A:
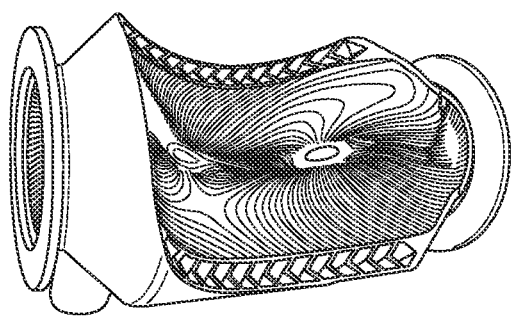
Figure 2E:
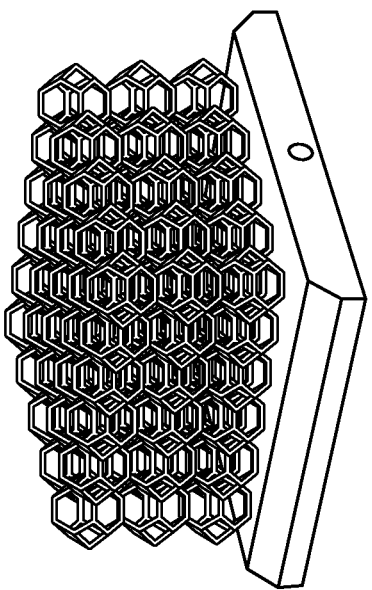

FIG. 6 shows a similar arrangement of composite part system 600 of the arrangement of FIG. 1B with the addition of example integrated heat sinks according to examples of the present disclosure. As shown in FIG. 6, composite part 604 is mounted on tool 606. Integrated heat sink 608, which can be created using the same manufacturing process that was used to form tool 606 and at the same time or at a different time, is mounted to an underside surface of tool 606 and provides a thermal sink for composite part 604, resulting in an evenly spread thermal surface on tool 606 and composite part 604. Additional supports 610 and 612 can be arranged at an edge of tool 606 and can be in the form of additional integrated heat sinks or have integrated heat sink-like properties. Additional supports 610 and 612 can take the any of the forms as shown in FIG. 2A. FIG. 2B, FIG. 2C, FIG. 2D, FIG. 2E, FIG. 2F, FIG. 3C, FIG. 3D, or FIG. 4, for example. Alternative forms of additional supports 610 and 612 can also be used based on the thermal characteristics of tool 606. Vacuum bag 602 is arranged on top surface of composite part 604 to provide a vacuum environment for composite part 604 to complete forming, such as finish bonding or curing depending on the type and/or process by which composite part 604 is being manufactured. Vacuum pump 614 provides a vacuum environment to vacuum bag 602 through vacuum couplers 616, 618 that are attached to vacuum ports 620, 622, respectively, arranged on first lateral portion 624 and second lateral portion 626, respectively. In the example shown in FIG. 6, vacuum ports 620, 622 are arranged to a top surface of vacuum bag 602, for example at areas offset from vacuum bag 602 and composite part 604, near central part contacting surface 628.

Figure 7:
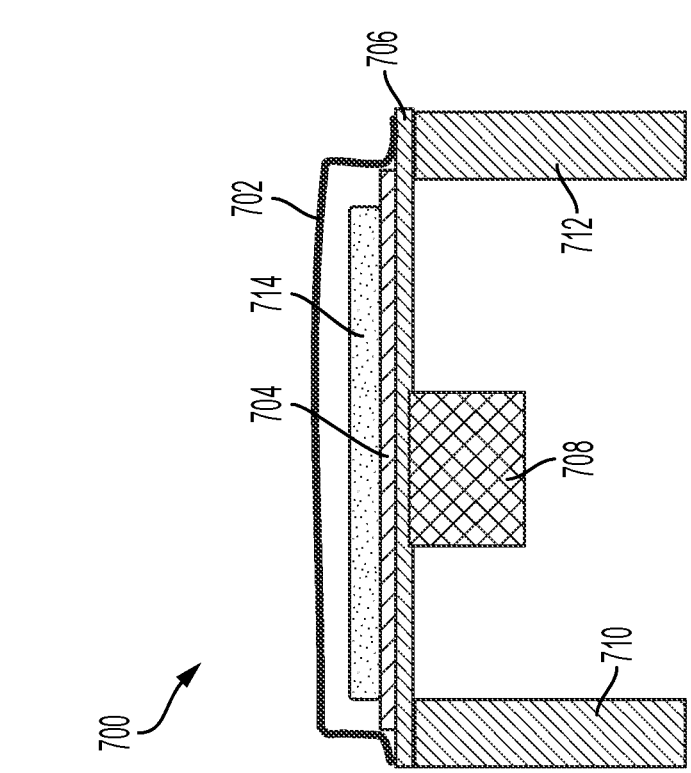
FIG. 7 shows a similar arrangement of composite part system 700 of the arrangement of FIG. 1B with the addition of example integrated heat sinks according to examples of the present disclosure.

FIG. 7 shows a similar arrangement of system 700 of the arrangement of FIG. 1B with the addition of example integrated heat sinks according to examples of the present disclosure. As shown in FIG. 7, composite part 704 is mounted on tool 706. Integrated heat sink 708, which can be created using the same manufacturing process that was used for tool 706 and at the same time or at a different time, is mounted to an underside surface of tool 706 and provides a thermal sink for tool 706 and composite part 704, resulting in an evenly spread thermal surface on tool 706 and composite part 704. Additional supports 710 and 712 can be arranged at an edge of tool 706. Additional supports 710 and 712 can take the any of the forms as shown in FIG. 2A, FIG. 2B, FIG. 2C, FIG. 2D, FIG. 2E, FIG. 2F, FIG. 3C, FIG. 3D, or FIG. 4, for example. Alternative forms of additional supports 710 and 712 can also be used based on the thermal characteristics of tool 706. Caul/pressure intensifier 714 is arranged within vacuum bag 702 and on a top surface of composite part 704 is provide additional pressure for completion of the manufacture (i.e., bonding and/or curing) of composite part 704. Caul/pressure intensifier 714 can be used as a replacement of the vacuum pump configuration of FIG. 5 and FIG. 6. As discussed above, a bag is a flexible material which conforms to the shape of the laid up composite material. On the bag side of a cured composite (in an autoclave or oven), a caul is used to create a smooth and more uniform surface that has tight profile tolerance requirements. A caul is typically a plate which mimics the bag side shape of the part. In places where there is a much more severe concavity (such as a c-channel, L or T profile with an up-standing leg, etc.), a plate cannot be used to achieve the effects of a caul plate. In that case, a pressure intensifier which mimic the volume inside the concavity is used to provide to appropriate rigid surface to intensify pressure where a bag cannot.

Figure 8:
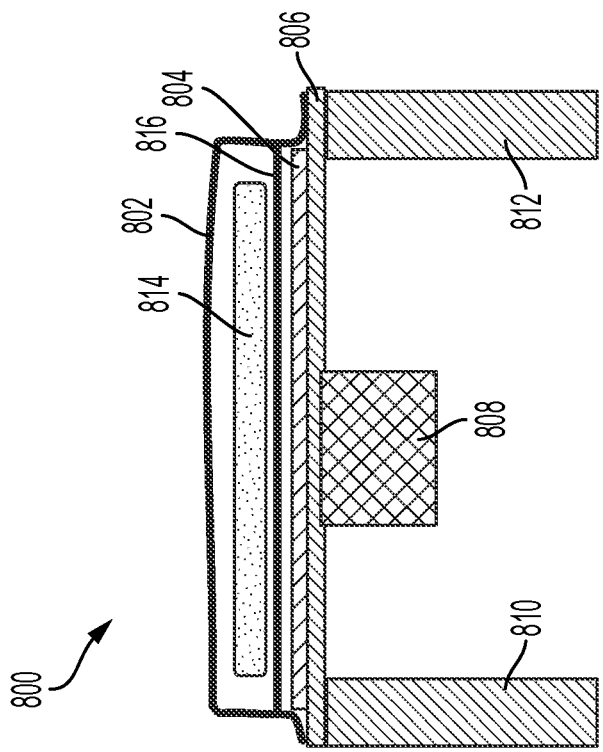
FIG. 8 shows a similar arrangement of composite part system 800 of the arrangement of FIG. 1B with the addition of example integrated heat sinks according to examples of the present disclosure.

FIG. 8 shows a similar arrangement of system 800 of the arrangement of FIG. 1B with the addition of example integrated heat sinks according to examples of the present disclosure. As shown in FIG. 8, composite part 804 is mounted on tool 806. Integrated heat sink 808, which can be created using the same manufacturing process that was used to form tool 806 and at the same time or at a different time, is mounted to an underside surface of tool 806 and provides a thermal sink for tool 806 and composite part 804, resulting in an evenly spread thermal surface on tool 806 and composite part 804. Additional supports 810 and 812 are arranged at an edge of tool 806. Additional supports 810 and 812 can take the any of the forms as shown in FIG. 2A, FIG. 2B, FIG. 2C, FIG. 2D, FIG. 2E, FIG. 2F, FIG. 3C, FIG. 3D, or FIG. 4, for example. Alternative forms of additional supports 810 and 812, which may be for example integrated heatsinks, can also be used based on the thermal characteristics of tool 806. Caul/pressure intensifier 814 is arranged within outer vacuum bag 802 and inner vacuum bag 816 and on a top surface of composite part 804 is provide additional pressure for completion of the manufacture (i.e., bonding and/or curing) of composite part 804.

Figure 9:
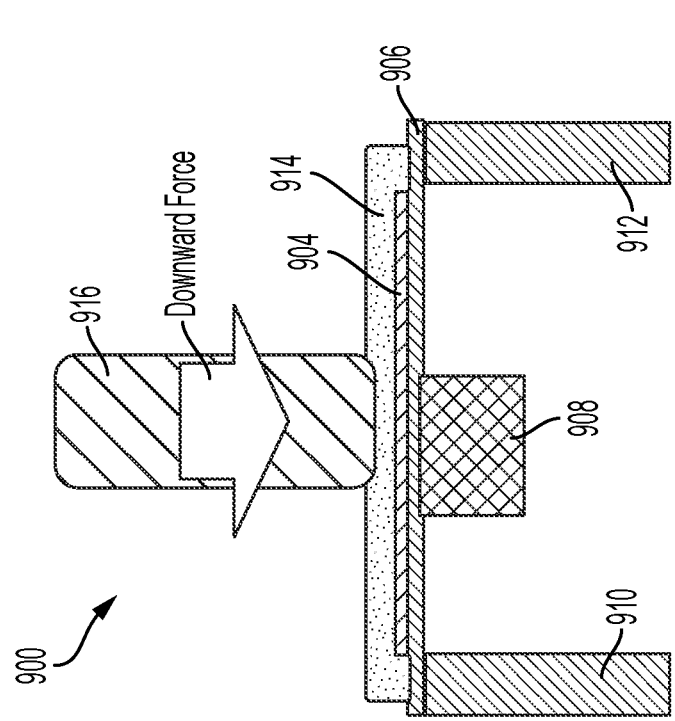
FIG. 9 shows a similar arrangement of composite part system 900 of the arrangement of FIG. 1B with the addition of example integrated heat sinks according to examples of the present disclosure.

FIG. 9 shows a similar arrangement of system 900 of the arrangement of FIG. 1B with the addition of example integrated heat sinks according to examples of the present disclosure. As shown in FIG. 9, composite part 904 is mounted on tool 906. Integrated heat sink 908, which can be created using the same manufacturing process that was used to form tool 906 and at the same time or at a different time, is mounted to an underside surface of tool 906 and provides a thermal sink for tool 906 and composite part 904, resulting in an evenly spread thermal surface on tool 906 and composite part 904. Additional supports 910 and 912 are arranged at an edge of tool 906. Additional supports 910 and 912 can take the any of the forms as shown in FIG. 2A, FIG. 2B, FIG. 2C, FIG. 2D, FIG. 2E, FIG. 2F, FIG. 3C, FIG. 3D, or FIG. 4, for example. Alternative forms of additional supports 910 and 912 can also be used based on the thermal characteristics of tool 906. A press, which is typically hydraulically actuated, can be used provide additional pressure to cure the composite part 904. The press comprises an actuator 916, however depending on the size of the press, multiple actuators may exist. Actuator 916 is connected to and moves heat press upper platen 914 that is arranged on a top surface of composite part 904 and provides additional pressure for completion of the manufacture (i.e., bonding and/or curing) of composite part 904. Heat press upper platen 914 can be used as a replacement of the vacuum pump configuration of FIG. 5 and FIG. 6.

Figure 10:
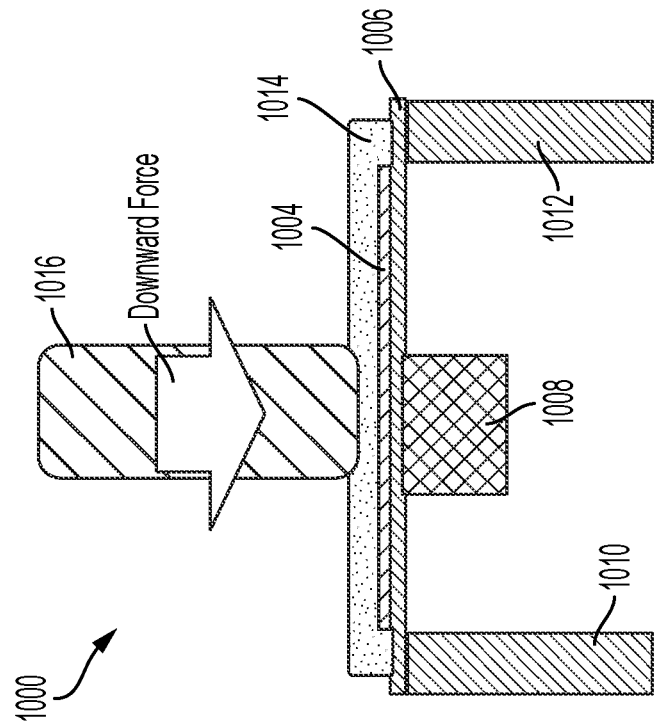
FIG. 10 shows a similar arrangement of composite part system 1000 of the arrangement of FIG. 1B with the addition of example integrated heat sinks according to examples of the present disclosure.

FIG. 10 shows a similar arrangement of system 1000 of the arrangement of FIG. 1B with the addition of example integrated heat sinks according to examples of the present disclosure. As shown in FIG. 10, composite part 1004 is mounted on tool 1006. Integrated heat sink 1008, which can be created using the same manufacturing process that was used to form tool 1006 and at the same time or at a different time, is mounted to an underside surface of tool 1006 and provides a thermal sink for tool 1006 and composite part 1004, resulting in an evenly spread thermal surface on tool 1006 and composite part 1004. Additional supports 1010 and 1012 are arranged at an edge of tool 1006. Additional supports 1010 and 1012 can take the any of the forms as shown in FIG. 2A, FIG. 2B, FIG. 2C, FIG. 2D, FIG. 2E, FIG. 2F, FIG. 3C, FIG. 3D, or FIG. 4, for example. Alternative forms of additional supports 1010 and 1012 can also be used based on the thermal characteristics of tool 1006. A press, which is typically hydraulically actuated, can be used provide additional pressure to cure the composite part 1004. The press comprises an actuator 1016, however depending on the size of the press, multiple actuators may exist. Actuator 1016 is connected to and moves heat press upper platen 1014 that is arranged on a top surface of composite part 1004 and provides additional pressure for completion of the manufacture (i.e., bonding and/or curing) of composite part 1004. Heat press upper platen 1014 can be used as a replacement of the vacuum pump configuration of FIG. 5 and FIG. 6.

Figure 12B:
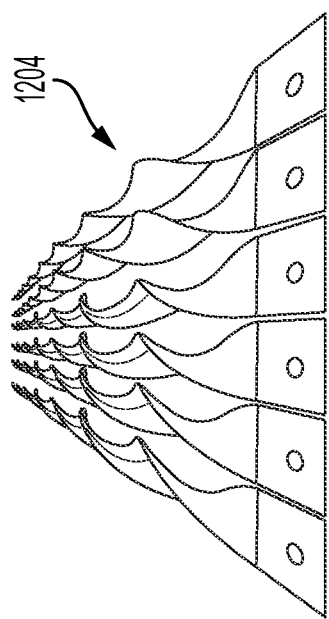
FIG. 12A, FIG. 12B, FIG. 12C, FIG. 12D, and FIG. 12E show example integrated heat sink geometry with turbulator features according to examples of the present disclosure.
Figure 12E:
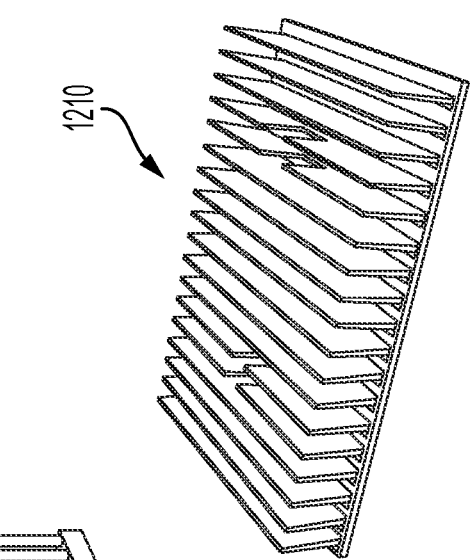
Figure 12C:
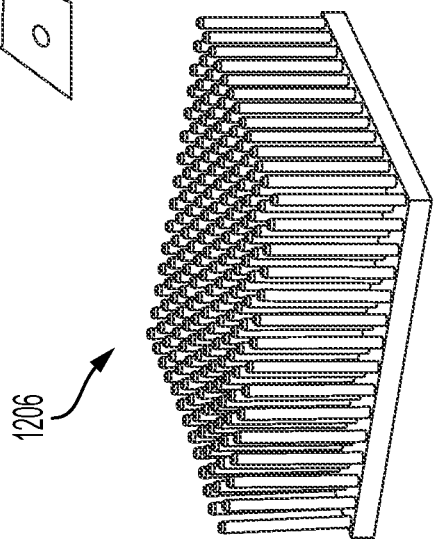
Figure 12A:
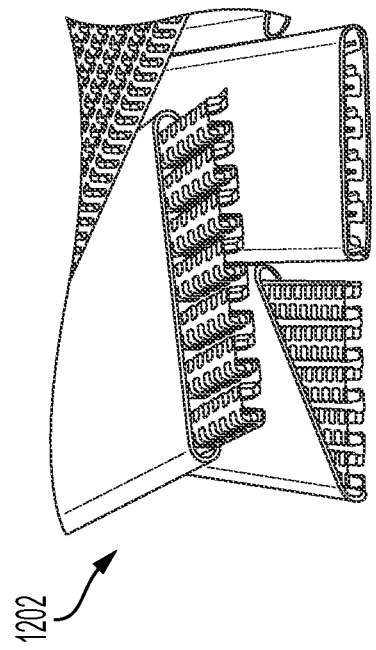
Figure 12D:
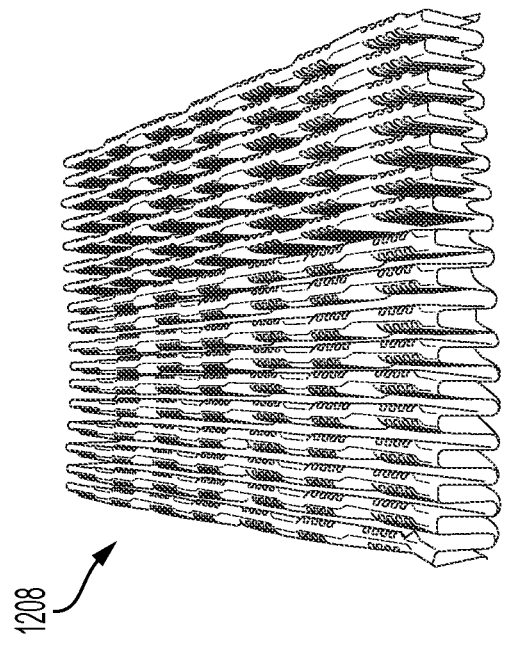

Integrated heat sink geometry in plumbed cavity can incorporate turbulator features to break up fluid boundary layer, which aids in thermal conductivity at wall/tool surface. For example, in some cases, the tooling configuration of a composite part could be considered "hard" on one side where there is a tool directly against the face of the part and "soft" on the other side of the part where a bag is directly against the part. On the bag side of the part, air is free to flow against the surface of the part. When a part has hard tooling on either side such as in the case of a heat press, compression molding, resin transfer molding, etc., airflow across the surface of the part is not present for convective heat transfer. In this case, a plumbed cavity beneath the tooling surface is filled with a liquid, such as water or oil, and the fluid is circulated through the cavity via a pump to enable convective heat transfer. For example, turbulator geometry examples are shown in FIG. 12A and FIG. 12E. Additional turbulator geometry can be generated through similar functional generative design and associated thermal optimization processes described above. This geometry can exist within the plumbed cavity to break up laminar fluid flow and enable more efficient heat transfer through the tool wall. Shape, placement, complexity of integrated heat sink geometry is tailorable and is to be placed to mitigate hot spots on part-tool thermal profile. A turbulator can be printed in place to mitigate fluid boundary effects seen in laminar or near laminar flow. The thermal boundary layer of a fluid decreases as laminar flow of a fluid is broken up. As the boundary layer decreases, it increases the wall temperature gradient and increases surface heat transfer rate. A laminar flow of fluid results in a greater thermal boundary layer and decreases heat transfer rate. This results in the previously stated "peaks" in thermal energy and thus issues with cure kinetics such as low degree of cure, porosity, etc. This feature can provide a controlled, but expedient cooling feature after laminate consolidation to increase manufacturing rate.

Figure 11B:
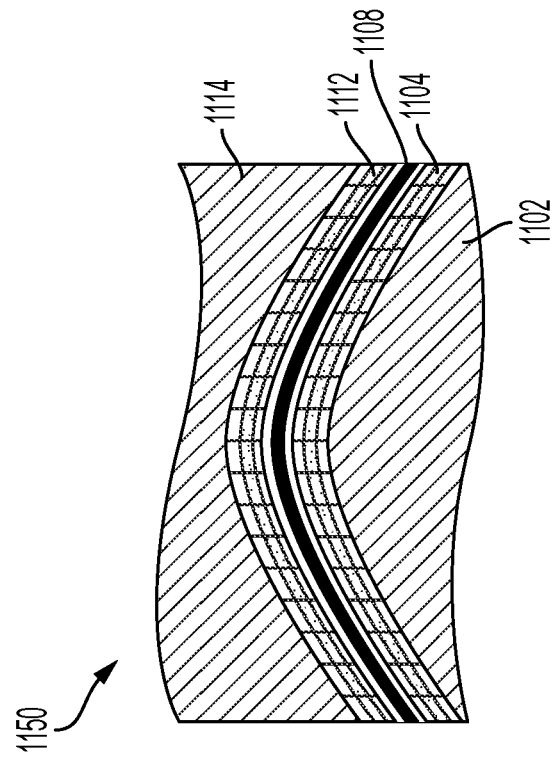
FIG. 11A and FIG. 11B show an integrated heat sink geometry in plumbed cavity that incorporate turbulator features to break up fluid boundary layer, which aids in thermal conductivity at wall/tool surface, in an exploded side view 1100 and an unexploded side view 1150, respectively, according to examples of the present disclosure.
Figure 11A:
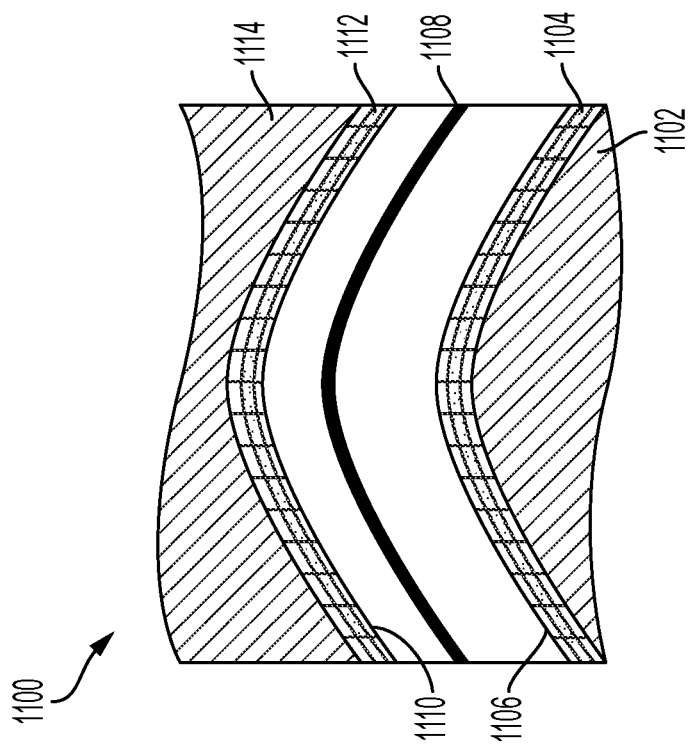

FIG. 11A and FIG. 11B show an integrated heat sink geometry in plumbed cavity 1104, 1112 that incorporate turbulator features, shown in FIG. 12A, FIG. 12B, FIG. 12C, FIG. 12D, and FIG. 12E, to break up fluid boundary layer, which aids in thermal conductivity at wall/tool surface, in an exploded side view 1100 and an unexploded side view 1150, respectively, according to examples of the present disclosure. For example, turbulator geometry examples are shown in FIG. 12A and FIG. 12 E. The integrated heat sink, according to this example, is formed using a tool having male tool component 1102 and female tool component 1114 that are pressed together to form the layers of the integrated heat sink. Female tool component 1114 comprises female tool surface 1110 that contacts the integrated heat sink and male tool component 1102 comprises male tool surface 1106 that contacts the integrated heat sink. The integrated heat sink comprises first plumbed cavity 1104 and second plumbed cavity 1112, which are both fluid exposed to the integrated heat sink geometry. Part 1108 of the integrated heat sink is arranged between first plumbed cavity 1104 and second plumbed cavity 1112. The shape, placement, complexity of integrated heat sink geometry is tailorable and is to be placed to mitigate hot spots on part-tool thermal profile. Turbulator can be printed in place to mitigate fluid boundary effects seen in laminar or near laminar flow. This feature can provide a controlled but expedient cooling feature after laminate consolidation to increase manufacturing rate.

FIG. 12A, FIG. 12B, FIG. 12C, FIG. 12D, and FIG. 12E show example integrated heat sink geometry with turbulator features 1202, 1204, 1206, 1208, and 1210, respectively, according to examples of the present disclosure. The shapes of the turbulator features can exist within the plumbed cavity. The plumbed cavities are shown in 1112 and 1104. The geometry of the various turbulator features that exists within the plumbed cavity, which function to break up laminar flow into turbulent flow and thus decrease the thermal boundary layer at the wall, which increases the wall temperature gradient and increases surface heat transfer rate. The geometry of the turbulator can be modified to tailor the boundary layer thickness and thus tailor the surface heat transfer rate across the surface area of the tool.

If the part-tool thermal profile were to change due to a manufacturing decision such as tool placement or orientation in autoclave/oven, modular multi-piece tooling would easily allow for a tooling component swap to mitigate hot spots associated with a new thermal profile. This modularity feature allows additional integrated heat sink geometry to be added with only a tool modular modification rather than the design and manufacture of a completely new tool.

Figure 13:
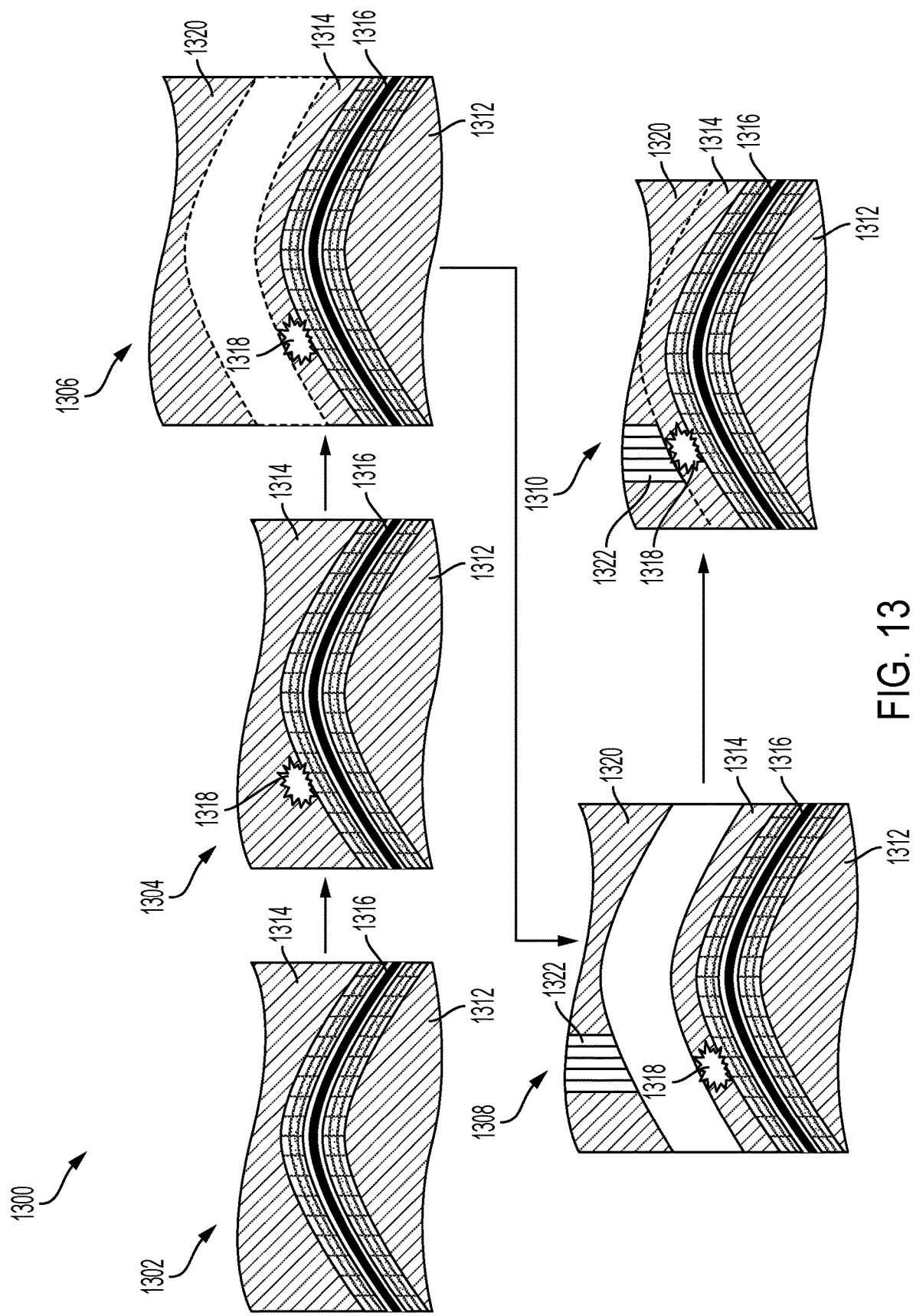
FIG. 13 shows a method 1300 for manufacturing an integrated heat sink, according to examples of the present disclosure.

FIG. 13 shows a method 1300 for manufacturing a heat sink, according to examples of the present disclosure. The features shown in FIG. 13 are similar to those shown in FIG. 11A and FIG. 11B. At 1302 integrated heat sink 1316 is shown being formed by applying pressure to a forming tool comprising male tool part 1312 and first female tool part 1314. At 1304, during thermal analysis, such as the thermal analysis of FIG. 1A, thermal hot spot 1318 is determined that may require further thermal mitigation. At 1306, second female tool part 1320 is applied over first female tool part 1314. At 1308, second female tool part 1320 is shown with an additional or revised integrated heat sink component 1322 that provides further thermal mitigation to thermal hot spot 1318. For example, the existing tool may need to be re-worked, which may require the addition of a heat sink because (a) the tool did not previously include a heat sink or (b) the thermal inputs have changed which alter the expected heat transfer and thus require the addition of a heat sink. For instance, the mass and/or material of a part could change if the same tool that was previously used to cure a laminate panel is now used to cure a honeycomb structure which also incorporates doubler plies for additional stiffness. At 1310, pressure is applied to a top surface of second female tool part 1320 to form the integrated heat sink with additional or revised integrated heat sink component 1322 of thermal hot spot. In this example, a tool which did not have an integrated heat sink built into the large mass of the tool at the location of a discrete hot spot or cold spot. To rework the tool, a large mass of the tool is excised, this area of the tool design is modified to include an integrated heat sink, and this portion of the reworked design is printed in place on top of the tool to replace the excised material.

In the above-described examples, the integrated heat sink geometry can be exposed to air circulating in the closed system of an oven or autoclave, or to ambient air surrounding a heat press. Alternatively, a bond jig or mold with internal plumbed cavities for water, oil, or other fluids could allow for integrated heat sink geometry to be fluid cooled rather than air cooled. For compression or injection molded parts (typically thermoplastic), ambient air-cooled, and internally plumbed fluid cooled examples are both applicable. Internally plumbed cooling enables a more consistent and rapid cool down without worry for warpage or crystallization, and thus can increase rate and add a means of cost savings through economy of scale. Benefits of the above-described tool include, but are not limited to, more consistent glass transition temperature (Tg) and Degree of Cure measurements across the face of a composite panel, and more predictable rheological behavior during cure. AM also enables other benefits such as weight optimization and integral vacuum ports to mitigate leak risk. AM also enables reimagined integrated heat sink shapes to optimize surface area and increase cooling.

Figure 14:
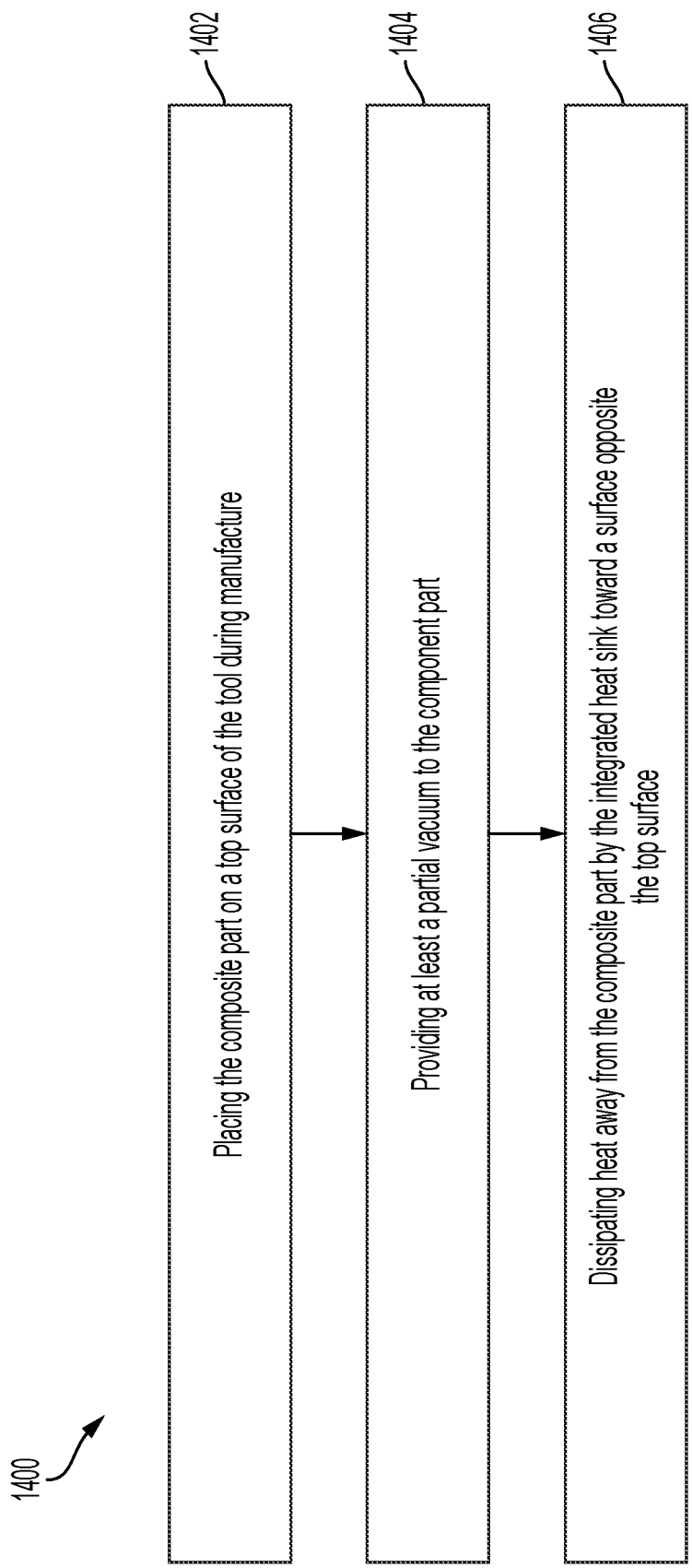
FIG. 14 shows a flowchart 1400 for a method of forming a composite part using a tool with an integrated heat sink according to examples of the present disclosure.

FIG. 14 shows a flowchart 1400 for a method of forming a composite part using a tool with an integrated heat sink according to examples of the present disclosure. The method comprises placing the composite part on a top surface of the tool during manufacture, as in 1402. For example, as shown in FIG. 6, composite part 604 is arranged on a top surface of tool 608. The method further comprises providing at least a partial vacuum to the component part, as in 1404. Continuing with the example of FIG. 6, vacuum bag 602 is arranged on a top surface of composite part 604 and vacuum pump 614 supplies at least a partial vacuum. The method further comprises dissipating heat away from the composite part by the integrated heat sink toward a surface opposite the top surface, as in 1406. A shape of the integrated heat sink is based on a thermal topology optimization process of the tool; and curing the composite part. Continuing with the example of FIG. 6, integrated heat sink 608 provides a thermal pathway to remove heat from tool 606 during formation of composite part 604.

Figure 15:
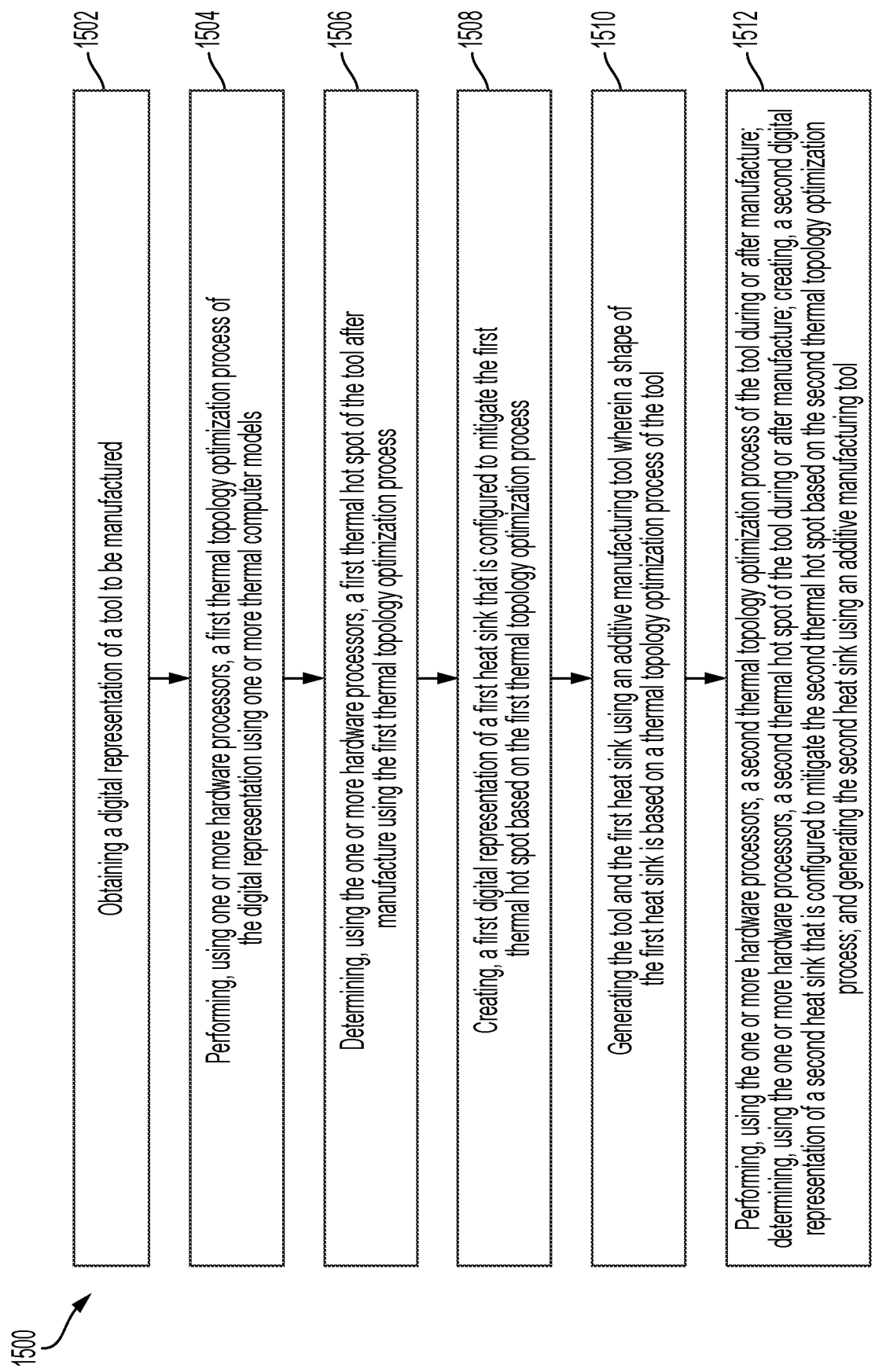
FIG. 15 shows a flowchart 1500 for a method for additive manufacturing of a tool for forming a composite part with an integrated heat sink according to examples of the present disclosure.

FIG. 15 shows a flowchart 1500 for a method for additive manufacturing of a tool for forming a composite part with an integrated heat sink according to examples of the present disclosure. The method comprises obtaining a digital representation of a tool to be additively manufactured, as in 1502. In some examples, the digital representation of the tool is a computer-aided design drawing. For example, as shown in FIG. 1A, computer 114 is used to obtain the digital representation of tool 110.

The method further comprises performing, using one or more hardware processors, a first thermal topology optimization process of the digital representation using one or more thermal computer models, as in 1504. In some examples, the first thermal topology optimization process is based on one or more parameters for heat transfer efficiency and maximizing surface area of the tool where the integrated heat sink is applied. Continuing with the example of FIG. 1A, computer 114 performs a thermal topology optimization process using one or more thermal models. The method further comprises determining, using the one or more hardware processors, a first thermal hot spot of the tool after manufacture using the first thermal topology optimization process, as in 1506. Continuing with the example of FIG. 1A, computer 114 determines thermal hot spot 106 of tool 110. The method further comprises creating, a first digital representation of a first integrated heat sink that is configured to mitigate the first thermal hot spot based on the first thermal topology optimization process, as in 1508. Continuing with the example of FIG. 1A, computer 114 creates the first digital representation of the first integrated heat sink, such as the various integrated heat sinks discussed above. The method further comprises generating the tool and the first integrated heat sink using an additive manufacturing tool wherein a shape of the first integrated heat sink is based on a thermal topology optimization process of the tool, as in 1510. A shape of the first integrated heat sink is based on the first thermal topology optimization process of the tool. In some examples, the tool and the first integrated heat sink are generated at the same time. In some examples, the tool and the first integrated heat sink are generated at different times. In some examples, the tool, the first integrated heat sink, or both the tool and the first integrated heat sink comprise one or more fluidic pathways for additional heat dissipation.

The method can further comprise performing, using the one or more hardware processors, a second thermal topology optimization process of the tool during or after manufacture; determining, using the one or more hardware processors, a second thermal hot spot of the tool during or after manufacture; creating, a second digital representation of a second integrated heat sink that is configured to mitigate the second thermal hot spot based on the second thermal topology optimization process; and generating the second integrated heat sink using an additive manufacturing tool, as in 1512.

Figure 16:
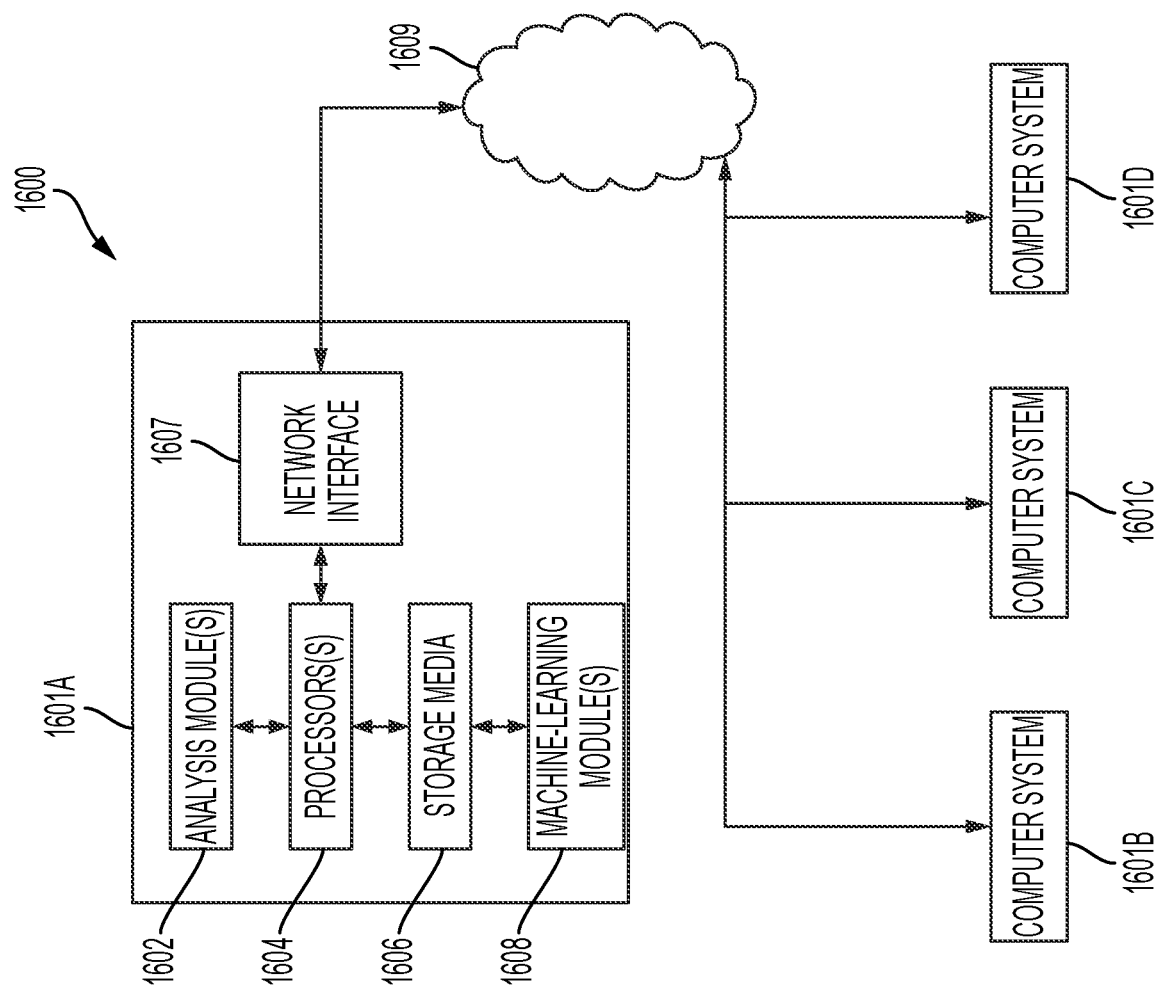
FIG. 16 illustrates a schematic view of a computing system 1600 according to examples of the present disclosure.

In some examples, any of the methods of the present disclosure may be executed by a computing system. FIG. 16 illustrates an example of such a computing system 1600, in accordance with some examples. The computing system 1600 may include a computer or computer system 1601A, which may be an individual computer system 1601A or an arrangement of distributed computer systems. The computer system 1601A includes one or more analysis module(s) 1602 configured to perform various tasks according to some examples, such as one or more methods disclosed herein. To perform these various tasks, the analysis module 1602 executes independently, or in coordination with, one or more processors 1604, which is (or are) connected to one or more storage media 1606. The processor(s) 1604 is (or are) also connected to a network interface 1607 to allow the computer system 1601A to communicate over a data network 1609 with one or more additional computer systems and/or computing systems, such as 1601B, 1601C, and/or 1601D (note that computer systems 1601B, 1601C and/or 1601D may or may not share the same architecture as computer system 1601A, and may be located in different physical locations, e.g., computer systems 1601A and 1601B may be located in a processing facility, while in communication with one or more computer systems such as 1601C and/or 1601D that are located in one or more data centers, and/or located in varying countries on different continents).

A processor can include a microprocessor, microcontroller, processor module or subsystem, programmable integrated circuit, programmable gate array, or another control or computing device.

The storage media 1606 can be implemented as one or more non-transitory computer-readable or machine-readable storage media. The storage media 1606 can be connected to or coupled with a thermal analysis machine learning module (s) 1608. Note that while in the example of FIG. 16 storage media 1606 is depicted as within computer system 1601A, in some examples, storage media 1606 may be distributed within and/or across multiple internal and/or external enclosures of computing system 1601A and/or additional computing systems. Storage media 1606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one non-transitory computer-readable or machine-readable storage medium, or alternatively, can be provided on multiple computer-readable or machine-readable storage media distributed in a large system having possibly plural nodes. Such non-transitory computer-readable or machine-readable storage medium or media is (are) considered to be part of an article (or article of manufacture). An article or article of manufacture can refer to any manufactured single component or multiple components. The storage medium or media can be located either in the machine running the machine-readable instructions or located at a remote site from which machine-readable instructions can be downloaded over a network for execution.

It should be appreciated that computing system 1600 is only one example of a computing system, and that computing system 1600 may have more or fewer components than shown, may combine additional components not depicted in the example of FIG. 16, and/or computing system 1600 may have a different configuration or arrangement of the components depicted in FIG. 16. The various components shown in FIG. 16 may be implemented in hardware, software, or a combination of both hardware and software, including one or more signal processing and/or application specific integrated circuits.

Further, the steps in the processing methods described herein may be implemented by running one or more functional modules in an information processing apparatus such as general-purpose processors or application specific chips, such as ASICs, FPGAs, PLDs, or other appropriate devices. These modules, combinations of these modules, and/or their combination with general hardware are all included within the scope of protection of the disclosure.

Thermal analysis and/or material or part constraint data, models and/or other interpretation aids may be refined in an iterative fashion; this concept is applicable to examples of the present methods discussed herein. This can include use of feedback loops executed on an algorithmic basis, such as at a computing device (e.g., computing system 1600, FIG. 16), and/or through manual control by a user who may make determinations regarding whether a given step, action, template, model, or set of curves has become sufficiently accurate for the evaluation of the signal(s) under consideration.

Further, the disclosure comprises examples according to the following clauses:

Clause 1. A tool for forming a composite part, the tool comprising:
  a top surface that supports the composite part during forming, the top surface comprising a first lateral portion and a second lateral portion arranged on either side of a central part contacting surface;
  a first integrated heat sink arranged on an opposite surface of the top surface, wherein a shape of the first integrated heat sink is based on a thermal topology optimization process of the tool;
  a first vacuum port arranged at a first location on the first lateral portion; and
  a second vacuum port arranged at a second location on the first lateral portion, wherein the first vacuum port and the second vacuum port provide access to a vacuum pump to provide at least a partial vacuum to the top surface during composite part formation.

Clause 2. The tool of clause 1, further comprising a second integrated heat sink arranged on the first lateral portion, the second lateral portion, or the opposite surface.

Clause 3. The tool of clause 1 or clause 2, wherein the tool, the first integrated heat sink, or both the tool and the first integrated heat sink comprise one or more fluidic pathways for additional heat dissipation.

Clause 4. The tool of any of clauses 1-3, further comprising an enclosure that is arranged over the top surface to provide the partial vacuum during the composite part formation.

Clause 5. A method of forming a composite part using a tool with an integrated heat sink, the method comprising:
  placing the composite part on a top surface of the tool during manufacture;
  providing at least a partial vacuum to the composite part; and
  dissipating heat away from the composite part by the integrated heat sink toward a surface opposite the top surface, wherein a shape of the integrated heat sink is based on a thermal topology optimization process of the tool to cure the composite part.

Clause 6. The method of clause 5, wherein the thermal topology optimization process comprises inputs comprises a geometrical envelope, one or more structural parameters, and one or more thermal inputs.

Clause 7. A method for manufacturing of a tool for forming a composite part with an integrated heat sink, the method comprising:
- obtaining a digital representation of the tool to be manufactured;
- performing, using one or more hardware processors, a first thermal topology optimization process of the digital representation using one or more thermal computer models;
- determining, using the one or more hardware processors, a first thermal hot spot of the tool after manufacture using the first thermal topology optimization process;
- creating, a first digital representation of a first integrated heat sink that is configured to mitigate the first thermal hot spot based on the first thermal topology optimization process; and
- generating the tool and the first integrated heat sink using a manufacturing tool, wherein a shape of the first integrated heat sink is based on the first thermal topology optimization process of the tool, wherein a shape of the first integrated heat sink is based on the first thermal topology optimization process of the tool.

Clause 8. The method of clause 7, wherein the digital representation of the tool is a computer-aided design drawing.

Clause 9. The method of clause 7 or clause 8, wherein the first thermal topology optimization process is based on one or more parameters for heat transfer efficiency and maximizing surface area of the tool where the heat sink is applied.

Clause 10. The method of any of clauses 7-9, wherein the tool and the first integrated heat sink are generated at the same time.

Clause 11. The method of any of clauses 7-10, wherein the tool and the first integrated heat sink are generated at different times.

Clause 12. The method of any of clauses 7-11, wherein the tool, the first integrated heat sink, or both the tool and the first integrated heat sink comprise one or more fluidic pathways for additional heat dissipation.

Clause 13. The method of any of clauses 7-12, further comprising:
- performing, using the one or more hardware processors, a second thermal topology optimization process of the tool during or after manufacture;
- determining, using the one or more hardware processors, a second thermal hot spot of the tool during or after manufacture;
- creating, a second digital representation of a second integrated heat sink that is configured to mitigate the second thermal hot spot based on the second thermal topology optimization process; and
- generating the second integrated heat sink.

Clause 14. A system comprising:
- a computer comprising a hardware processor and a storage media that stores instruction that when executed by the hardware processor perform a method for additive manufacturing of a tool for forming a composite part with an integrated heat sink, the method comprising:
- obtaining a digital representation of a tool to be manufactured;
- performing, using one or more hardware processors, a first thermal topology optimization process of the digital representation using one or more thermal computer models;
- determining, using the one or more hardware processors, a first thermal hot spot of the tool after manufacture using the first thermal topology optimization process;
- creating, a first digital representation of a first integrated heat sink that is configured to mitigate the first thermal hot spot based on the first thermal topology optimization process; and
- generating the tool and the first integrated heat sink using a manufacturing tool, wherein a shape of the first integrated heat sink is based on the first thermal topology optimization process of the tool.

Clause 15. The system of clause 14, wherein the first thermal topology optimization process is based on one or more parameters for heat transfer efficiency and maximizing surface area of the tool where the integrated heat sink is applied.

Clause 16. The system of any of clauses 14-15, wherein the tool and the first integrated heat sink are generated at the same time.

Clause 17. The system of any of clauses 14-16, wherein the tool and the first integrated heat sink are generated at different times.

Clause 18. The system of any of clauses 14-17, wherein the tool, the first integrated heat sink, or both the tool and the first integrated heat sink comprise one or more fluidic pathways for additional heat dissipation.

Clause 19. The system of any of clauses 14-18, wherein the hardware processor is further configured to perform the method comprising:
- performing, using the one or more hardware processors, a second thermal topology optimization process of the tool during or after manufacture;
- determining, using the one or more hardware processors, a second thermal hot spot of the tool during or after manufacture;
- creating, a second digital representation of a second integrated heat sink that is configured to mitigate the second thermal hot spot based on the second thermal topology optimization process; and
- generating the second integrated heat sink.

Clause 20. The system of any of clauses 14-19, wherein the first thermal topology optimization process comprises inputs comprises a geometrical envelope, one or more structural parameters, and one or more thermal inputs.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The examples were chosen and described in order to best explain the principles of the invention and its practical applications, to thereby enable others skilled in the art to best utilize the invention and various examples with various modifications as are suited to the particular use contemplated.

What is claimed is:
1. A method for manufacturing of a tool for forming a composite part with an integrated heat sink, the method comprising:

obtaining a digital representation of the tool to be manufactured;
performing, using one or more hardware processors, a first thermal topology optimization process of the digital representation using one or more thermal computer models;
determining, using the one or more hardware processors, a first thermal hot spot of the tool after manufacture using the first thermal topology optimization process;
creating, a first digital representation of a first integrated heat sink that is configured to mitigate the first thermal hot spot based on the first thermal topology optimization process; and
generating the tool and the first integrated heat sink using a manufacturing tool, wherein a shape of the first integrated heat sink is based on the first thermal topology optimization process of the tool, wherein a shape of the first integrated heat sink is based on the first thermal topology optimization process of the tool.

2. The method of claim 1, wherein the digital representation of the tool is a computer-aided design drawing.

3. The method of claim 1, wherein the first thermal topology optimization process is based on one or more parameters for heat transfer efficiency and maximizing surface area of the tool where the integrated heat sink is applied.

4. The method of claim 1, wherein the tool and the first integrated heat sink are generated at the same time.

5. The method of claim 1, wherein the tool and the first integrated heat sink are generated at different times.

6. The method of claim 1, wherein the tool, the first integrated heat sink, or both the tool and the first integrated heat sink comprise one or more fluidic pathways for additional heat dissipation.

7. The method of claim 1, further comprising:
performing, using the one or more hardware processors, a second thermal topology optimization process of the tool during or after manufacture;
determining, using the one or more hardware processors, a second thermal hot spot of the tool during or after manufacture;
creating, a second digital representation of a second integrated heat sink that is configured to mitigate the second thermal hot spot based on the second thermal topology optimization process; and
generating the integrated second heat sink.

8. A system comprising:
a computer comprising a hardware processor and a storage media that stores instruction that when executed by the hardware processor perform a method for additive manufacturing of a tool for forming a composite part with an integrated heat sink, the method comprising:
obtaining a digital representation of a tool to be manufactured;
performing, using one or more hardware processors, a first thermal topology optimization process of the digital representation using one or more thermal computer models;
determining, using the one or more hardware processors, a first thermal hot spot of the tool after manufacture using the first thermal topology optimization process;
creating, a first digital representation of a first integrated heat sink that is configured to mitigate the first thermal hot spot based on the first thermal topology optimization process; and
generating the tool and the first integrated heat sink using a manufacturing tool, wherein a shape of the first integrated heat sink is based on the first thermal topology optimization process of the tool.

9. The system of claim 8, wherein the first thermal topology optimization process is based on one or more parameters for heat transfer efficiency and maximizing surface area of the tool where the integrated heat sink is applied.

10. The system of claim 8, wherein the tool and the first integrated heat sink are generated at the same time.

11. The system of claim 8, wherein the tool and the first integrated heat sink are generated at different times.

12. The system of claim 8, wherein the tool, the first integrated heat sink, or both the tool and the first integrated heat sink comprise one or more fluidic pathways for additional heat dissipation.

13. The system of claim 8, wherein the hardware processor is further configured to perform the method comprising:
performing, using the one or more hardware processors, a second thermal topology optimization process of the tool during or after manufacture;
determining, using the one or more hardware processors, a second thermal hot spot of the tool during or after manufacture;
creating, a second digital representation of a second integrated heat sink that is configured to mitigate the second thermal hot spot based on the second thermal topology optimization process; and
generating the second integrated heat sink.

14. The system of claim 8, wherein the first thermal topology optimization process comprises inputs comprises a geometrical envelope, one or more structural parameters, and one or more thermal inputs.

15. A non-transitory computer readable medium that stores instructions, for execution by a hardware processor, to perform a method for manufacturing of a tool for forming a composite part with an integrated heat sink, the method comprising:
obtaining a digital representation of the tool to be manufactured;
performing, using one or more hardware processors, a first thermal topology optimization process of the digital representation using one or more thermal computer models;
determining, using the one or more hardware processors, a first thermal hot spot of the tool after manufacture using the first thermal topology optimization process;
creating, a first digital representation of a first integrated heat sink that is configured to mitigate the first thermal hot spot based on the first thermal topology optimization process; and
generating the tool and the first integrated heat sink using a manufacturing tool, wherein a shape of the first integrated heat sink is based on the first thermal topology optimization process of the tool, wherein a shape of the first integrated heat sink is based on the first thermal topology optimization process of the tool.

16. The non-transitory computer readable medium of claim 15, wherein the digital representation of the tool is a computer-aided design drawing.

17. The non-transitory computer readable medium of claim 15, wherein the first thermal topology optimization process is based on one or more parameters for heat transfer efficiency and maximizing surface area of the tool where the integrated heat sink is applied.

18. The non-transitory computer readable medium of claim 15, wherein the tool and the first integrated heat sink are generated at the same time.

19. The non-transitory computer readable medium of claim 15, wherein the tool and the first integrated heat sink are generated at different times.

20. The non-transitory computer readable medium of claim 15, wherein the tool, the first integrated heat sink, or both the tool and the first integrated heat sink comprise one or more fluidic pathways for additional heat dissipation.

* * * * *